(12) United States Patent
Gao et al.

(10) Patent No.: US 12,481,808 B2
(45) Date of Patent: Nov. 25, 2025

(54) OPTIMIZED DESIGNING METHOD FOR LAMINATE PREFORM OF CERAMIC MATRIX COMPOSITE

(71) Applicant: NANJING UNIVERSITY OF AERONAUTICS AND ASTRONAUTICS, Jiangsu (CN)

(72) Inventors: Xiguang Gao, Jiangsu (CN); Chenyang Liu, Jiangsu (CN); Yingdong Song, Jiangsu (CN); Sheng Zhang, Jiangsu (CN); Hongnian Dong, Jiangsu (CN); Guoqiang Yu, Jiangsu (CN); Chengqian Dong, Jiangsu (CN); Chao You, Jiangsu (CN); Lu Zhang, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 1080 days.

(21) Appl. No.: 17/603,281

(22) PCT Filed: Jul. 8, 2021

(86) PCT No.: PCT/CN2021/105170
§ 371 (c)(1),
(2) Date: Oct. 12, 2021

(87) PCT Pub. No.: WO2022/037305
PCT Pub. Date: Feb. 24, 2022

(65) Prior Publication Data
US 2022/0309213 A1 Sep. 29, 2022

(30) Foreign Application Priority Data
Aug. 20, 2020 (CN) .......... 202010846564.2

(51) Int. Cl.
*G06F 30/23* (2020.01)
*G06F 111/10* (2020.01)
*G06F 113/26* (2020.01)

(52) U.S. Cl.
CPC .......... *G06F 30/23* (2020.01); *G06F 2111/10* (2020.01); *G06F 2113/26* (2020.01)

(58) Field of Classification Search
CPC ........ G06F 30/23; G06F 30/25; G06F 30/367; G06F 30/398; G06F 2111/00–2119/22; Y02T 90/00
See application file for complete search history.

(56) References Cited

U.S. PATENT DOCUMENTS

| 6,355,206 B1 * | 3/2002 | Hanzawa | C04B 41/87 |
| | | | 266/286 |
| 2017/0101873 A1 * | 4/2017 | Morgan | B32B 18/00 |

FOREIGN PATENT DOCUMENTS

| CN | 109920495 A | * | 6/2019 |
| CN | 109920495 B | * | 3/2020 |

* cited by examiner

*Primary Examiner* — Rehana Perveen
*Assistant Examiner* — Troy A Maust
(74) *Attorney, Agent, or Firm* — James W. Huffman; Huffman Law Group, PC

(57) ABSTRACT

The present disclosure provides an optimized designing method for a laminate preform of a ceramic matrix composite e. With overall consideration of a strength requirement of a component, a geometric shape and properties of the laminate preform, the method includes: optimizing, based on a corresponding mechanical formula, a fiber volume fraction of each laminate constituting the preform and a fiber direction in the laminate, and selecting a preferred microscopic structure for each laminate, thereby taking full advantage of material performance. The method is applicable for optimized design of various components of the ceramic matrix composite.

10 Claims, 2 Drawing Sheets

OPTIMIZED DESIGNING METHOD FOR LAMINATE PREFORM OF CERAMIC MATRIX COMPOSITE

CROSS REFERENCE TO RELATED APPLICATION(S)

The present disclosure claims the priority of Chinese Patent Application No. CN 202010846564.2, filed to the China National Intellectual Property Administration (CNIPA) on Aug. 20, 2020 and entitled "OPTIMIZED DESIGNING METHOD FOR LAMINATE PREFORM OF CERAMIC MATRIX COMPOSITE", which is incorporated herein by reference in its entirety.

TECHNICAL FIELD

The present disclosure pertains to the field of designing a ceramic matrix composite, and particularly relates to an optimized designing method for a laminate preform of a ceramic matrix composite.

BACKGROUND ART

A ceramic matrix composite is an advanced composite formed by compounding a ceramic as a matrix and a variety of fibers. With the density being only ⅓-¼ of that of a superalloy, the ceramic matrix composite is preferred for a thermal end part of an aero-engine with a high thrust-weight ratio. However, the ceramic matrix composite is a typical heterogeneous anisotropic multiphase material. Thus, the preform structure of the ceramic matrix composite has substantial influences on the macroscopic mechanical performance. If not rationally designed, the preform structure cannot bring the optimal performance of the material into full play, and even cannot meet the most basic design requirement.

In the prior art, the macroscopic shape of a component is merely modified to adapt to the feature of the ceramic matrix composite. What is considered is how to form a desired macroscopic structure from reinforcement fibers, instead of how to optimize the preform structure. For example, as disclosed in Chinese Application No. CN 201711371076.5, titled "TURBINE ROTOR BLADE MADE OF CERAMIC MATRIX COMPOSITE", many macroscopic sealing structures are taken into consideration in the disclosure, but there is no detailed design solution to a core preform structure of a blade body. As another example, as described in Chinese Application No. CN 201810612357.3, titled "DESIGN method OF CERAMIC-BASED TURBINE ROTOR BLADE PREFORM", the method provides a design solution to a laminate preform of a turbine rotor blade, but the solution does not provide a fiber volume fraction of each laminate and a fiber direction in the laminate, thereby hindering full play of the fiber performance.

Therefore, it becomes a significant and challenging task to optimize a laminate preform structure of the ceramic matrix composite in the initial design process and take full advantage of the performance of the ceramic matrix composite in the art.

SUMMARY

In view of the deficiencies in the prior art, the present disclosure provides an optimized designing method for a laminate preform of a ceramic matrix composite, so as to select a preferred microscopic structure of a laminate and optimize a fiber volume fraction of the laminate and a fiber direction in the laminate, thereby bringing the material performance into full play.

In order to achieve the objective, the present disclose adopts the following technical solution.

An optimized designing method for a laminate preform of a ceramic matrix composite includes:

step 1: creating, based on a strength analysis result of a macroscopic model of a ceramic matrix composite component, a preliminary design solution to a laminate preform structure;

step 2: carrying out finite element strength analysis on the laminate preform structure in step 1, to obtain corresponding first principal stress, normal stress and shear stress of each finite element unit;

step 3: calculating, according to a stress result obtained in step 2, an included angle between the first principal stress of each finite element unit and a reference rectangular coordinate system;

step 4: utilizing the included angle of each finite element unit obtained in step 3 to change an element coordinate system of each finite element unit, such that a material principal direction of each finite element unit is consistent with a direction of the first principal stress;

step 5, utilizing a rule of mixture for a composite to calculate a material parameter of each finite element unit;

step 6: carrying out, according to the material parameter of each finite element unit obtained in step 5, strength analysis on the laminate preform structure in step 1 again, and returning to step 1 to redesign the laminate preform structure when a strength requirement is not met; and step 7: selecting, according to a transverse strength calculation formula of the rule of mixture for a composite in conjunction with a strength analysis result obtained in step 6, an appropriate microscopic structure type for each laminate.

In order to optimize the technical solution, a specific measure further includes:

Further, in the step 1, carrying out finite element strength analysis on the macroscopic model of the ceramic matrix composite component to extract a position of a unit in a stress distribution boundary region, and importing the position into the macroscopic model for reflection of the position, whereby the laminate preform structure of the ceramic matrix composite is preliminarily designed.

Further, in the step 2, the corresponding first principal stress $\sigma_1$, normal stresses $\sigma_x$ and $\sigma_y$ and shear stresses $\tau_{yx}$, $\tau_{zx}$ and $\tau_{zy}$ of each finite element unit are obtained, $\sigma_x$ and $\sigma_y$ denoting normal stresses in an X-axis direction and a Y-axis direction respectively, $\tau_{yx}$ denoting a shear stress in a direction perpendicular to a Y axis and parallel to an X axis, $\tau_{zx}$ denoting a shear stress in a direction perpendicular to a Z axis and parallel to the X axis, $\tau_{zy}$ denoting a shear stress in a direction perpendicular to the Z axis and parallel to the Y axis, and X, Y and Z being three coordinate axes in the reference rectangular coordinate system.

Further, in the step 3, the following formula of a state of stress at a given point is utilized to obtain an included angle between a first principal stress direction of each finite element unit and each of the three coordinate axes of the reference rectangular coordinate system:

$$l_1(\sigma_x - \sigma_1) + m_1 \tau_{yx} + n_1 \tau_{zx} = 0$$

-continued $$l_1 \tau_{xy} + m_1(\sigma_y - \sigma_1) + n_1 \tau_{zy} = 0$$

$$l_1 = \frac{1}{\sqrt{1 + \left(\frac{m_1}{l_1}\right)^2 + \left(\frac{n_1}{l_1}\right)^2}}$$

$$m_1 = \frac{1}{\sqrt{1 + \left(\frac{l_1}{m_1}\right)^2 + \left(\frac{n_1}{m_1}\right)^2}}$$

$$n_1 = \frac{1}{\sqrt{1 + \left(\frac{l_1}{n_1}\right)^2 + \left(\frac{m_1}{n_1}\right)^2}}$$

where, $l_1$, $m_1$ and $n_1$ are the included angles between the first principal stress and the X axis, the first principal stress and the Y axis, and the first principal stress and the Z axis of the reference rectangular coordinate system, respectively.

Further, in the step 5, on the premise that the first principal stress, fiber strength and matrix strength are known, the following rule of mixture for a composite is utilized to obtain the material parameter of each finite element unit:

a fiber volume fraction:

$$V_f = \frac{\sigma_1 - \sigma_m}{\sigma_f - \sigma_m}$$

where, $V_f$ is the fiber volume fraction, $\sigma_1$ is the first principal stress, $\sigma_f$ is a maximum stress borne by a reinforcement fiber, and $\sigma_m$ is a maximum stress borne by a matrix;

an elastic modulus:

$$E_1 = E_f V_f + E_m(1 - V_f)$$

$$E_2 = E_3 = \frac{E_m E_f}{E_m V_f + E_f(1 - V_f)}$$

where, $E_1$, $E_2$ and $E_3$ are elastic moduli in three directions 1, 2 and 3 of the composite, a direction 1 being a fiber reinforcement direction, and directions 2 and 3 being two directions perpendicular to the fiber reinforcement direction, $E_f$ is an elastic modulus of the reinforcement fiber, and $E_m$ is an elastic modulus of the matrix;

a Poisson's ratio:

$$v_{12} = v_{13} = v_f V_f + v_m(1 - V_f)$$

$$V_{23} = \frac{E_2}{2G_{23}} - 1$$

where, $v_{12}$, $v_{13}$ and $v_{23}$ are Poisson's ratios in the three directions of the composite, $v_{12}$ denoting compressive (tensile) strain, caused by unit tensile (compressive) strain in the direction 1, in the direction 2, $v_{13}$ denoting compressive (tensile) strain, caused by unit tensile (compressive) strain in the direction 1, in the direction 3, and $v_{23}$ denoting compressive (tensile) strain, caused by unit tensile (compressive) strain in the direction 2, in the direction 3, $v_f$ is a Poisson's ratio of the reinforcement fiber, and $v_m$ is a Poisson's ratio of the matrix;

a shear modulus:

$$G_{12} = G_{13} = \frac{G_m G_f}{G_m V_f + G_f(1 - V_f)}$$

$$G_{23} = \frac{G_{f23} G_m}{G_{f23}(1 - V_f) + G_m V_f}$$

where, $G_{12}$, $G_{13}$ and $G_{23}$ are shear moduli in three directions of the composite, and denote ratios of a shear stress to shear strain in the directions 1 to 2, the directions 1 to 3 and the directions 2 to 3, $G_f$ is a shear modulus of the reinforcement fiber, $G_m$ is a shear modulus of the matrix, and $G_{f23}$ is a shear modulus in the directions 2 to 3 of the reinforcement fiber; and transverse strength:

$$\sigma_2 = \sigma_m[1 - 2(V_f/\pi)^{1/2}]$$

where, $\sigma_2$ is the transverse strength and $\sigma_m$ is matrix strength.

Further, in the step 7, the microscopic structure type includes a unidirectional reinforcement structure, a plain weave structure and a three-dimensional weave structure.

The present disclosure has achieved the beneficial effects as described below.

1. The laminate preform structure of the present disclosure is designed based on an actual stress of the ceramic matrix composite component, and the design solution can effectively improve bearing capacity of the component.

2. Compared with the prior art, according to stresses on different parts of the ceramic matrix composite component, the present disclosure selects different preferred microscopic structures and optimizes the fiber volume fraction and the fiber direction, thereby bringing the performance of the ceramic matrix composite into full play to a greater extent.

3. The optimization method provided by the present disclosure is suitable for optimized design of various components of ceramic matrix composite.

DETAILED DESCRIPTION OF THE EMBODIMENTS

The present disclosure is described in further detail below with reference to the accompanying drawings.

Figure 1:
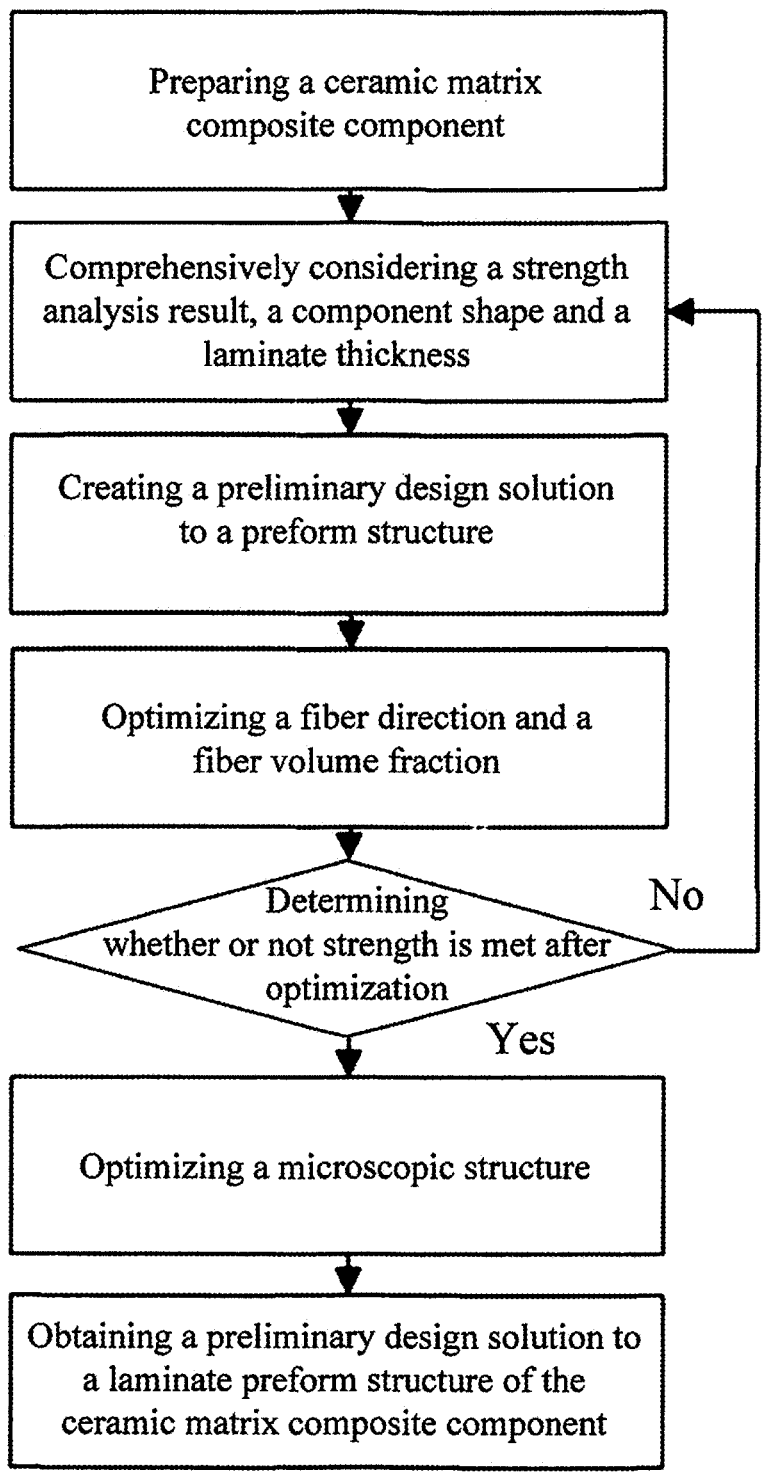
FIG. 1 is a flowchart of a design solution for optimizing a laminate preform.

As shown in FIG. 1, an optimized designing method for a laminate preform particularly includes the steps as follows.

In step 1: a preliminary design solution is created based on a strength analysis result of a macroscopic model of a ceramic matrix composite component. Finite element strength analysis is carried out on the macroscopic model of the ceramic matrix composite component to extract a position of a unit in a stress distribution boundary region, and the position is reflected in a component model to complete preliminary design of a laminate preform structure of the component.

In step 2: a stress result after a finite element analysis is extracted. Finite element strength analysis is carried out on a designed laminate preform model of the component in step 1, to obtain the corresponding first principal stress $\sigma_1$, normal stresses $\sigma_x$ and $\sigma_y$, and shear stresses $\tau_{yx}$, $\tau_{zx}$ and $\tau_{zy}$ of each finite element unit.

In step 3: an included angle between the first principal stress of each finite element unit and a reference coordinate system is derived. A formula of a state of stress at a given point (where, $l_1$, $m_1$ and $n_1$ are included angles between the first principal stress and an X axis, the first principal stress and a Y axis, and the first principal stress and a Z axis of the reference coordinate system, respectively) is utilized to obtain an included angle between a first principal stress direction of each finite element unit and each of three coordinate axes of the reference rectangular coordinate system:

$$l_1(\sigma_x - \sigma_1) + m_1\tau_{yx} + n_1\tau_{zx} = 0$$

$$l_1\tau_{xy} + m_1(\sigma_y - \sigma_1) + n_1\tau_{zy} = 0$$

$$l_1 = \frac{1}{\sqrt{1 + \left(\frac{m_1}{l_1}\right)^2 + \left(\frac{n_1}{l_1}\right)^2}}$$

$$m_1 = \frac{1}{\sqrt{1 + \left(\frac{l_1}{m_1}\right)^2 + \left(\frac{n_1}{m_1}\right)^2}}$$

$$n_1 = \frac{1}{\sqrt{1 + \left(\frac{l_1}{n_1}\right)^2 + \left(\frac{m_1}{n_1}\right)^2}}$$

In step 4: a material principal direction changes with an element coordinate system in finite element software. The included angle of each finite element unit obtained in step 3 is utilized to change an element coordinate system of each finite element unit, so that a material principal direction of each unit is consistent with the direction of the first principal stress.

In step 5: given that bearing strength of the composite considered in the present method refers to a maximum stress borne by both a fiber and a matrix, a rule of mixture for a composite may be utilized to obtain a volume fraction (fiber volume fraction) of each finite element unit on the premise that the first principal stress, fiber strength $\sigma_f$ (that is, a maximum stress borne by a reinforcement fiber) and matrix strength $\sigma_m$ (that is, a maximum stress borne by the matrix). An influence, on other material parameters, from the volume fraction may also be derived from the rule of mixture for a composite:

a fiber volume fraction is calculated by:

$$V_f = \frac{\sigma_1 - \sigma_m}{\sigma_f - \sigma_m}$$

where, $V_f$ is the fiber volume fraction, $\sigma_1$ is the first principal stress, $\sigma_f$ is the maximum stress borne by the reinforcement fiber, and $\sigma_m$ is the maximum stress borne by the matrix;

an elastic modulus is calculated by:

$$E_1 = E_f V_f + E_m(1 - V_f)$$

$$E_2 = E_3 = \frac{E_m E_f}{E_m V_f + E_f(1 - V_f)}$$

where, $E_1$, $E_2$ and $E_3$ are elastic moduli in three directions 1, 2 and 3 of the composite, a direction 1 being a fiber reinforcement direction, and directions 2 and 3 being two directions perpendicular to the fiber reinforcement direction, $E_f$ is an elastic modulus of the reinforcement fiber, and $E_m$ is an elastic modulus of the matrix;

a Poisson's ratio is calculated by:

$$v_{12} = v_{13} = v_f V_f + v_m(1 - V_f)$$

$$v_{23} = \frac{E_2}{2G_{23}} - 1$$

where, $v_{12}$, $v_{13}$ and $v_{23}$ are Poisson's ratios in the three directions of the composite, $v_f$ is a Poisson's ratio of the reinforcement fiber, and $v_m$ is a Poisson's ratio of the matrix;

a shear modulus is calculated by:

$$G_{12} = G_{13} = \frac{G_m G_f}{G_m V_f + G_f(1 - V_f)}$$

$$G_{23} = \frac{G_{f23} G_m}{G_{f23}(1 - V_f) + G_m V_f}$$

where, $G_{12}$, $G_{13}$ and $G_{23}$ are shear moduli in three directions of the composite, $G_f$ is a shear modulus of the reinforcement fiber, $G_m$ is a shear modulus of the matrix, and $G_{f23}$ is a shear modulus in a direction 2 to 3 of the reinforcement fiber; and transverse strength is calculated by:

$$\sigma_2 = \sigma_m[1 - 2(V_f/\pi)^{1/2}]$$

where, $\sigma_2$ is the transverse strength, and $\sigma_m$ is matrix strength, the transverse strength being perpendicular to a reinforcement direction.

In step 6: according to a new material parameter of each finite element unit obtained in step 5, strength analysis is carried out on the laminate preform structure of the ceramic matrix composite component in step 1 again, returning to step 1 to redesign the laminate preform structure when a strength requirement is not met.

In step 7: a final optimization design solution is determined. A microscopic structure of the composite includes a unidirectional reinforcement structure, a plain weave structure and a three-dimensional weave structure. The unidirectional reinforcement structure has only one reinforcement direction, and has weaker strength in the other two directions; the plain weave structure has two reinforcement directions, and has weaker strength in a thickness direction; and the three-dimensional weave structure has excellent mechanical performance in three directions. According to the transverse strength calculation formula of the rule of mixture for a composite, a calculation result obtained in step 6 is analyzed, and an appropriate microscopic structure type (unidirectional reinforcement, plain weave and three-dimensional weave) is selected for each laminate to meet the strength requirement. To this end, the method provides a macroscopic shape of each laminate of a component preform, selects a preferred microscopic structure type for each laminate, and optimizes a fiber volume fraction of the laminate and a fiber direction (the first principal stress direction) in the laminate.

Figure 2:
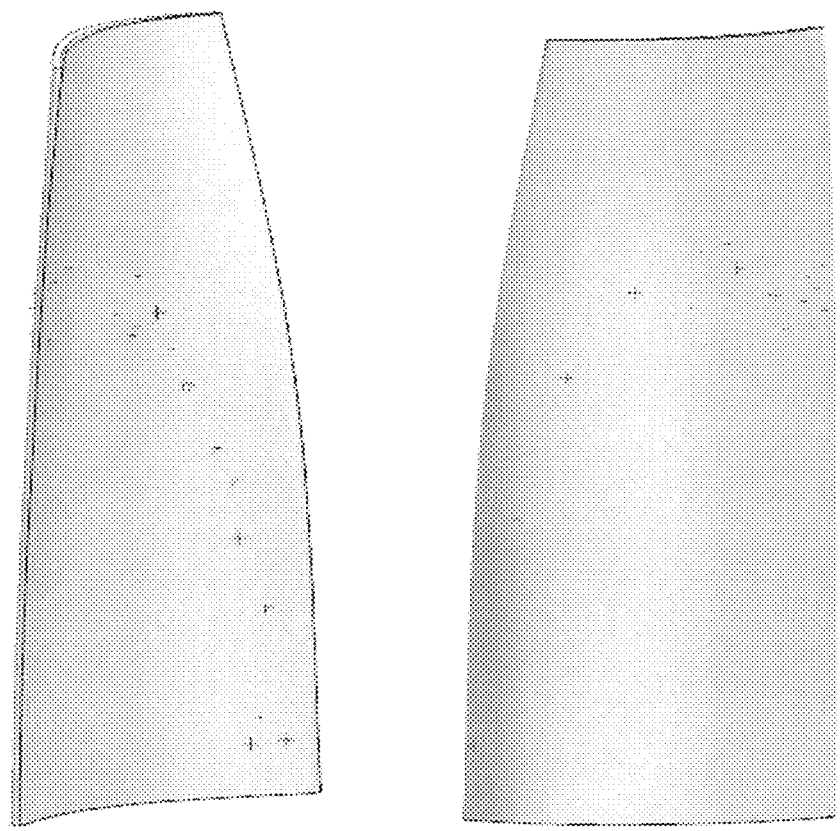
FIG. 2 is a diagram showing a position distribution of a stress boundary unit at a blade body portion of a turbine rotor blade.
Figure 3:
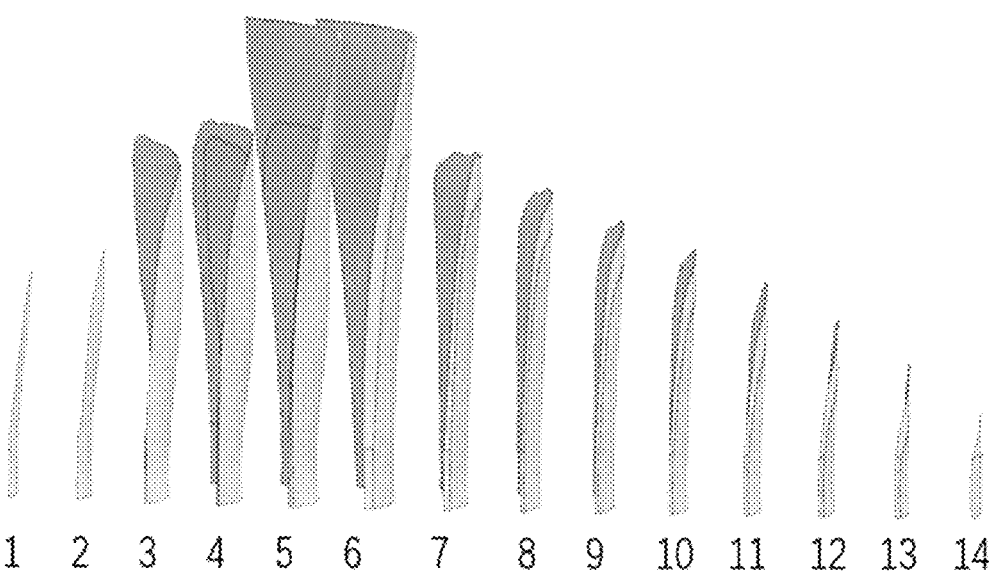
FIG. 3 is a schematic diagram of a design solution to a laminate preform of a blade body of the turbine rotor blade.

Next, the present method is illustrated by taking a complex component, a turbine rotor blade of a certain aeroengine, as an example. Emphasis is put on an optimization result of a laminate preform of its blade body portion. The method particularly includes:

(1) A laminate preform structure is formed by stacking a SiC fiber cloth, firstly, finite element analysis software is utilized to analyze strength of a macroscopic model of a ceramic matrix turbine rotor blade to extract a coordinate of stress boundary points and further import these points into the macroscopic model of the blade to make them reflected in a component model, as shown in FIG. 2. In consideration of a geometric shape of a blade body and the coordinates of a series of imported stress boundary points, it is found that the blade body may be divided into three parts of a middle, a concave and a convex. Then, a solution to a laminate of each part is refined according to a thickness of a single layer of SiC fiber cloth to finally obtain a blade body structure. As shown in FIG. 3, a laminate preform structure of the blade body portion is formed by stacking 14 SiC fiber cloths of different shapes.

(2) The finite element analysis software is utilized to analyze strength of the laminate preform structure of the blade body designed in (1), to obtain the corresponding first principal stress $\sigma_1$, normal stresses $\sigma_x$ and $\sigma_y$, and shear stresses $\tau_{yx}$, $\tau_{zx}$ and $\tau_{zy}$ of each finite element unit.

(3) A formula of a state of stress at a given point in step 3 is utilized to obtain an included angle between a first principal stress direction of each finite element unit and each of three coordinate axes of a reference rectangular coordinate system. In the finite element analysis software, elastic moduli in three directions are defined when a material parameter of a silicon carbide fiber is defined, where a direction with a maximum modulus is a material principal direction. A material principal direction in each finite element unit changes as a direction of a coordinate axis of an element coordinate system changes. A material principal direction of the unit may be changed by changing the direction of the coordinate axis of the element coordinate system, and the element coordinate system may be changed by creating a local coordinate system. In the finite element analysis software, the local coordinate system is created by sequentially rotating X, Y and Z axes of the reference coordinate system, so it is required to know three included angles between the principal direction of each unit and a global coordinate system. A fiber direction is optimized based on the method.

(4) The formula of the rule of mixture for a composite in step 5 is utilized to determine an optimal volume fraction of the laminate preform structure, subjected to fiber optimization in (3), of the blade body and modify a corresponding material parameter.

(5) Strength analysis is carried out for a solution after volume fraction optimization in (4) again, proceeding to a next step when a strength requirement is met, otherwise returning to (1).

(6) A preferred microscopic structure of each laminate is selected according to step 7 to obtain a final solution to optimized design of the laminate preform structure of the blade body. As shown in FIG. 3, after a preliminary design solution to the laminate preform of a blade body component is optimized, laminates 1-4 use the plain weave structure, laminates 5-8 use the unidirectional reinforcement structure, fiber volume fractions in laminates 1-6 are 10.4%, 10.0%, 8.5%, 8.1%, 5.0% and 6.8%, respectively, and fiber volume fractions in laminates 7-14 are all 5.0%.

What is described above is merely the preferred implementation of the present disclosure, the scope of protection of the present disclosure is not limited to the above embodiments, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. An optimized designing method for a laminate preform of a ceramic matrix composite, comprising:
    step 1: creating, based on a strength analysis result of a macroscopic model of a ceramic matrix composite component, a preliminary design solution to a laminate preform structure;
    step 2: carrying out finite element strength analysis on the laminate preform structure in step 1, to obtain corresponding first principal stress, normal stress and shear stress of each finite element unit;
    step 3: calculating, according to a stress result obtained in step 2, an included angle between the first principal stress of each finite element unit and a reference rectangular coordinate system;
    step 4: utilizing the included angle of each finite element unit obtained in step 3 to change an element coordinate system of each finite element unit, such that a material principal direction of each finite element unit is consistent with a direction of the first principal stress;
    step 5, utilizing a rule of mixture for a composite to calculate a material parameter of each finite element unit;
    step 6: carrying out, according to the material parameter of each finite element unit obtained in step 5, strength analysis on the laminate preform structure in step 1 again, and returning to step 1 to redesign the laminate preform structure when a strength requirement is not met; and
    step 7: selecting, according to a transverse strength calculation formula of the rule of mixture for a composite in conjunction with a strength analysis result obtained in step 6, an appropriate microscopic structure type for each laminate.

2. The optimized designing method for a laminate preform of a ceramic matrix composite according to claim 1, wherein in the step 1, the method further comprises: carrying out finite element strength analysis on the macroscopic model of the ceramic matrix composite component to extract a position of a unit in a stress distribution boundary region, and importing the position of the unit into the macroscopic model for reflection of the position, whereby the laminate preform structure of the ceramic matrix composite component is preliminarily designed.

3. The optimized designing method for a laminate preform of a ceramic matrix composite according to claim 1, wherein in the step 2, the corresponding first principal stress $\sigma_1$, normal stresses $\sigma_x$ and $\sigma_y$, and shear stresses $\tau_{yx}$, $\tau_{zx}$ and $\tau_{zy}$ of each finite element unit are obtained, $\sigma_x$ and $\sigma_y$ denoting normal stresses in an X-axis direction and a Y-axis direction respectively, $\tau_{yx}$ denoting a shear stress in a direction perpendicular to a Y axis and parallel to an X axis, $\tau_{zx}$ denoting a shear stress in a direction perpendicular to a Z axis and parallel to the X axis, $\tau_{zy}$ denoting a shear stress in a direction perpendicular to the Z axis and parallel to the Y axis, and X, Y and Z being three coordinate axes in the reference rectangular coordinate system.

4. The optimized designing method for a laminate preform of a ceramic matrix composite according to claim 3, wherein in the step 3, the included angle is one between a first principal stress direction of each finite element unit and each of the three coordinate axes of the reference rectangular coordinate system.

5. The optimized designing method for a laminate preform of a ceramic matrix composite according to claim 3, wherein in the step 3, the following formula of a state of stress at a given point is utilized to obtain the included angle between the first principal stress direction of each finite element unit and each of the three coordinate axes of the reference rectangular coordinate system:

$$l_1(\sigma_x - \sigma_1) + m_1\tau_{yx} + n_1\tau_{zx} = 0$$

$$l_1\tau_{xy} + m_1(\sigma_y - \sigma_1) + n_1\tau_{zy} = 0$$

$$l_1 = \frac{1}{\sqrt{1 + \left(\frac{m_1}{l_1}\right)^2 + \left(\frac{n_1}{l_1}\right)^2}}$$

$$m_1 = \frac{1}{\sqrt{1 + \left(\frac{l_1}{m_1}\right)^2 + \left(\frac{n_1}{m_1}\right)^2}}$$

$$n_1 = \frac{1}{\sqrt{1 + \left(\frac{l_1}{n_1}\right)^2 + \left(\frac{m_1}{n_1}\right)^2}}$$

wherein $l_1$, $m_1$ and $n_1$ are the included angles between the first principal stress and the X axis, the first principal stress and the Y axis, and the first principal stress and the Z axis of the reference rectangular coordinate system, respectively.

6. The optimized designing method for a laminate preform of a ceramic matrix composite according to claim 4, wherein in the step 3, the following formula of a state of stress at a given point is utilized to obtain the included angle between the first principal stress direction of each finite element unit and each of the three coordinate axes of the reference rectangular coordinate system:

$$l_1(\sigma_x - \sigma_1) + m_1\tau_{yx} + n_1\tau_{zx} = 0$$

$$l_1\tau_{xy} + m_1(\sigma_y - \sigma_1) + n_1\tau_{zy} = 0$$

$$l_1 = \frac{1}{\sqrt{1 + \left(\frac{m_1}{l_1}\right)^2 + \left(\frac{n_1}{l_1}\right)^2}}$$

$$m_1 = \frac{1}{\sqrt{1 + \left(\frac{l_1}{m_1}\right)^2 + \left(\frac{n_1}{m_1}\right)^2}}$$

$$n_1 = \frac{1}{\sqrt{1 + \left(\frac{l_1}{n_1}\right)^2 + \left(\frac{m_1}{n_1}\right)^2}}$$

wherein $l_1$, $m_1$ and $n_1$ are the included angles between the first principal stress and the X axis, the first principal stress and the Y axis, and the first principal stress and the Z axis of the reference rectangular coordinate system, respectively.

7. The optimized designing method for a laminate preform of a ceramic matrix composite according to claim 1, wherein in the step 5, the material parameters comprise a fiber volume fraction, an elastic modulus, a Poisson's ratio, a shear modulus, and transverse strength.

8. The optimized designing method for a laminate preform of a ceramic matrix composite according to claim 1, wherein in the step 5, on the premise that the first principal stress, fiber strength and matrix strength are known, the following rule of mixture for a composite is utilized to obtain the material parameter of each finite element unit:

a fiber volume fraction:

$$V_f = \frac{\sigma_1 - \sigma_m}{\sigma_f - \sigma_m}$$

wherein $V_f$ is the fiber volume fraction, $\sigma_1$ is the first principal stress, $\sigma_f$ is a maximum stress borne by a reinforcement fiber, and $\sigma_m$ is a maximum stress borne by a matrix;

an elastic modulus:

$$E_1 = E_f V_f + E_m(1 - V_f)$$

$$E_2 = E_3 = \frac{E_m E_f}{E_m V_f + E_f(1 - V_f)}$$

wherein $E_1$, $E_2$ and $E_3$ are elastic moduli in three directions 1, 2 and 3 of the composite, a direction 1 being a fiber reinforcement direction, and directions 2 and 3 being two directions perpendicular to the fiber reinforcement direction, $E_f$ is an elastic modulus of the reinforcement fiber, and $E_m$ is an elastic modulus of the matrix;

a Poisson's ratio:

$$v_{12} = v_{13} = v_f V_f + v_m(1 - V_f)$$

$$v_{23} = \frac{E_2}{2G_{23}} - 1$$

wherein $v_{12}$, $v_{13}$ and $v_{23}$ are Poisson's ratios in the three directions of the composite, $v_{12}$ denoting strain, caused by unit strain in the direction 1, in the direction 2, $v_{13}$ denoting strain, caused by unit strain in the direction 1, in the direction 3, $v_{23}$ denoting strain, caused by unit strain in the direction 2, in the direction 3, $v_f$ is a Poisson's ratio of the reinforcement fiber, and $v_m$ is a Poisson's ratio of the matrix;

a shear modulus:

$$G_{12} = G_{13} = \frac{G_m G_f}{G_m V_f + G_f(1 - V_f)}$$

$$G_{23} = \frac{G_{f23} G_m}{G_{f23}(1 - V_f) + G_m V_f}$$

wherein $G_{12}$, $G_{13}$ and $G_{23}$ are shear moduli in three directions of the composite, and denote ratios of a shear stress to shear strain in the directions 1 to 2, the directions 1 to 3 and the directions 2 to 3, $G_f$ is a shear modulus of the reinforcement fiber, $G_m$ is a shear modulus of the matrix, and $G_{f23}$ is a shear modulus in the directions 2 to 3 of the reinforcement fiber; and transverse strength:

$$\sigma_2 = \sigma_m[1 - 2(V_f/\pi)^{1/2}]$$

wherein $\sigma_2$ is the transverse strength and $\sigma_m$ is matrix strength.

9. The optimized designing method for a laminate preform of a ceramic matrix composite according to claim 7, wherein in the step 5, on the premise that the first principal stress, fiber strength and matrix strength are known, the following rule of mixture for a composite is utilized to obtain the material parameter of each finite element unit:

a fiber volume fraction:

$$V_f = \frac{\sigma_1 - \sigma_m}{\sigma_f - \sigma_m}$$

wherein $V_f$ is the fiber volume fraction, $\sigma_1$ is the first principal stress, $\sigma_f$ is a maximum stress borne by a reinforcement fiber, and $\sigma_m$ is a maximum stress borne by a matrix;

an elastic modulus:

$$E_1 = E_f V_f + E_m(1 - V_f)$$

$$E_2 = E_3 = \frac{E_m E_f}{E_m V_f + E_f(1 - V_f)}$$

wherein $E_1$, $E_2$ and $E_3$ are elastic moduli in three directions 1, 2 and 3 of the composite, a direction 1 being a fiber reinforcement direction, and directions 2 and 3 being two directions perpendicular to the fiber reinforcement direction, $E_f$ is an elastic modulus of the reinforcement fiber, and $E_m$ is an elastic modulus of the matrix;

a Poisson's ratio:

$$v_{12} = v_{13} = v_f V_f + v_m(1 - V_f)$$

$$v_{23} = \frac{E_2}{2G_{23}} - 1$$

wherein $v_{12}$, $v_{13}$ and $v_{23}$ are Poisson's ratios in the three directions of the composite, $v_{12}$ denoting strain, caused by unit strain in the direction 1, in the direction 2, $v_{13}$ denoting strain, caused by unit strain in the direction 1, in the direction 3, $v_{23}$ denoting strain, caused by unit strain in the direction 2, in the direction 3, $v_f$ is a Poisson's ratio of the reinforcement fiber, and $v_m$ is a Poisson's ratio of the matrix;

a shear modulus:

$$G_{12} = G_{13} = \frac{G_m G_f}{G_m V_f + G_f(1 - V_f)}$$

$$G_{23} = \frac{G_{f23} G_m}{G_{f23}(1 - V_f) + G_m V_f}$$

wherein $G_{12}$, $G_{13}$ and $G_{23}$ are shear moduli in three directions of the composite, and denote ratios of a shear stress to shear strain in the directions 1 to 2, the directions 1 to 3 and the directions 2 to 3, $G_f$ is a shear modulus of the reinforcement fiber, $G_m$ is a shear modulus of the matrix, and $G_{f23}$ is a shear modulus in the directions 2 to 3 of the reinforcement fiber; and transverse strength:

$$\sigma_2 = \sigma_m[1 - 2(V_f/\pi)^{1/2}]$$

wherein $\sigma_2$ is the transverse strength and $\sigma_m$ is matrix strength.

10. The optimized designing method for a laminate preform of a ceramic matrix composite according to claim 1, wherein in the step 7, a microscopic structure type comprises a unidirectional reinforcement structure, a plain weave structure and a three-dimensional weave structure.

* * * * *